United States Patent Office.

NEWTON TROWBRIDGE AND EDWARD RICHARDSON, OF TULLY, NEW YORK.

Letters Patent No. 77,418, dated April 28, 1868.

IMPROVED ROOFING-CEMENT.

*The Schedule referred to in these Letters Patent and making part of the same.*

TO ALL WHOM IT MAY CONCERN:

Be it known that we, NEWTON TROWBRIDGE and EDWARD RICHARDSON, of Tully, in the county of Onondaga, and State of New York, have invented a new and useful Improvement in Roofing-Cement; and we do hereby declare that the following is a full, clear, and exact description of the mode of compounding and preparing the same.

Take of crude India rubber, eight pounds; of rosin, forty pounds; of crude petroleum, one gallon, and melt them together over a slow fire until all the ingredients are dissolved.

Then add one hundred and twenty pounds of rosin, three gallons of crude petroleum, and half a pound of sulphur; melt them and mix thoroughly. When this has been done, add one peck of water-lime, and two and three-fourths bushels of dry sand.

The roof should be covered with a light pasteboard, which may be saturated in petroleum before being laid. Then apply the above compound with a stiff brush or float.

The pasteboard is not, however, an essential part of the roofing, for the same composition may be applied to tin, sheet iron, or wood. The composition may also be used for laying sidewalks.

What we claim as our invention, and desire to secure by Letters Patent, is—

The composition, compounded from the ingredients, and in the manner substantially as and for the purpose set forth.

In testimony whereof, we have signed our names to this specification in the presence of two subscribing witnesses.

NEWTON TROWBRIDGE,
EDWARD RICHARDSON.

Witnesses:
JUDSON S. WRIGHT,
CONE WILLIAMS.